United States Patent
Käfer et al.

(10) Patent No.: US 10,853,996 B2
(45) Date of Patent: *Dec. 1, 2020

(54) EFFICIENT GENERATION OF TERRAIN OPENNESS

(71) Applicant: Mapbox, Inc., San Francisco, CA (US)

(72) Inventors: Konstantin Friedrich Käfer, Berlin (DE); Ansis Brammanis, Toronto (CA)

(73) Assignee: Mapbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,866

(22) Filed: Oct. 4, 2019

(65) Prior Publication Data

US 2020/0035018 A1    Jan. 30, 2020

Related U.S. Application Data

(63) Continuation of application No. 16/058,818, filed on Aug. 8, 2018, now Pat. No. 10,482,654.

(Continued)

(51) Int. Cl.
*G06T 15/80* (2011.01)
*G06T 15/04* (2011.01)
(Continued)

(52) U.S. Cl.
CPC .............. *G06T 15/80* (2013.01); *G06F 16/29* (2019.01); *G06T 15/04* (2013.01); *G06T 15/20* (2013.01); *G06T 15/503* (2013.01); *G06T 17/05* (2013.01)

(58) Field of Classification Search
None
See application file for complete search history.

(56) References Cited

U.S. PATENT DOCUMENTS 8,031,193 B1 * 10/2011 Henderson .............. G06T 17/05
345/426
2013/0194260 A1 * 8/2013 Kunath ................... G06T 17/05
345/420

(Continued)

OTHER PUBLICATIONS

Tovar-Pescador, J., et al. "On the use of the digital elevation model to estimate the solar radiation in areas of complex topography." Meteorological Applications 13.3 (2006): 279-287. (Year: 2006).*

(Continued)

*Primary Examiner* — Vu Nguyen
(74) *Attorney, Agent, or Firm* — Fenwick & West LLP; Christopher-Charles King; Michael C. Walsh

(57) ABSTRACT

Efficiently generating terrain openness involves a digital elevation model comprising a texture representing a first geographic area and at least part of a plurality of mipmap levels representing geographic areas bordering the first geographic area. The texture and mipmap levels include pixels encoding elevation values for locations of geographic areas. For each pixel of the texture, derivatives are determined, as well as an openness factor based at least in part on the elevations at one or more pixels of the mipmap levels. The derivatives and openness factor are added to the texture. A hill shading factor is determined for each pixel based at least in part on the derivatives. An electronic map of the first geographic area is rendered using the openness and hill shading factors of each pixel of the texture. The rendering is sent for display.

17 Claims, 9 Drawing Sheets

Related U.S. Application Data

(60) Provisional application No. 62/544,706, filed on Aug. 11, 2017.

(51) Int. Cl.
 G06T 17/05 (2011.01)
 G06F 16/29 (2019.01)
 G06T 15/50 (2011.01)
 G06T 15/20 (2011.01)

(56) References Cited

U.S. PATENT DOCUMENTS

2013/0321411 A1* 12/2013 Pahwa .................... G06T 17/05
 345/420
2018/0253893 A1* 9/2018 Shkolnikov ............ G06T 15/60

OTHER PUBLICATIONS

Yokoyama, Ryuzo, Michio Shirasawa, and Richard J. Pike. "Visualizing topography by openness: a new application of image processing to digital elevation models." Photogrammetric engineering and remote sensing 68.3 (2002): 257-266. (Year: 2002).*

Yokoyama, R. et al., "Visualizing topography by openness: a new application of image processing to digital elevation models," Photogrammetric engineering and remote sensing, 2002, vol. 68, No. 3, pp. 257-266.

Zaksek, K. et al., "Sky-view factor as a relief visualization technique," Remote sensing, 2011, vol. 3, No. 2, pp. 398-415.

* cited by examiner

EFFICIENT GENERATION OF TERRAIN OPENNESS

CROSS-REFERENCE TO RELATED APPLICATIONS

This application is a continuation of U.S. application Ser. No. 16/058,818, filed Aug. 8, 2018, which claims the benefit of U.S. Provisional Application No. 62/544,706, filed Aug. 11, 2017, both of which are incorporated by reference herein.

BACKGROUND

1. Field of Art

The disclosure relates generally to the field of electronic map rendering and specifically to the representation of elevated terrain features when displayed on a screen of a computing device.

2. Description of the Related Art

Digitally stored electronic maps represent geographic information of an area and are displayed to users of mobile and other computing devices, for example, using any of a wide array of standalone map or direction application programs or apps. The manner in which electronic maps are represented varies depending upon the purpose of the map and what it is intended to convey to users. Some electronic maps use hill shading to better visually represent elevation changes among different parts of the map's terrain.

SUMMARY

Geographical maps are increasingly created and stored in an electronic format, and represent spatial aspects of a given area. In many use cases of electronic maps it is desirable to represent geographic information in a visually pleasing and comprehensible manner. For example, if a map corresponds to a geographic area comprising hilly terrain, it can be desirable to visually represent those hills such that a user of the electronic map can easily distinguish their approximate shapes, sizes, and elevations. This can be done using coloring techniques when displaying the electronic map on a display of a mobile computing device, for example. If the electronic map is displayed using pixels, the specific colors used for each pixel can radically change how the user interprets the displayed map.

Hill shading, or "shaded relief," is one terrain visualization technique where terrain of varying elevation is colored based on the slopes and aspects of those elevation changes. Slope is the rate at which elevation changes and aspect is the direction of the slope. Using a color scheme based on slope and elevation allows for intuitive visual distinction of hills and other elevated terrain features. For example, certain sides of elevated terrain features are colored lighter shades, and the others darker, to mimic how the sun fails to uniformly illuminate true geographic features, with certain sides falling into shade because of the azimuth (direction) and zenith (angle relative to the horizon) of the sun.

Adding a layer of coloration, or adjusting coloration, based on the openness of each location represented by the map can further improve the visual distinctiveness and comprehensibility of elevated terrain features. Openness, for example, can be a factor used for adjustment, and is based on the amount of sky which would be visible to a person standing at a given location. A location within a narrow gorge will have a much different openness factor than a location atop a mountain peak, for example.

Determining openness factors for use when rendering an electronic map upon a display can be expensive in terms of computer resource use. For example, if each pixel of a digital elevation model of a geographic area is used as a location from which to determine an openness factor for use when rendering an electronic map of the geographic area, those determinations may require enough computer resources and time that many computer processors, often including those within modern mobile devices, will be unable to render such maps in a responsive manner thereby diminishing the usefulness of the map. For example, if the user adjusts the electronic map to display a different geographic area, rendering the different area may take enough time that the map appears only after a delay or updates in a sluggish manner from the user's perspective.

In one embodiment, a first method involves a texture of a digital elevation model where each pixel of the texture encodes an elevation pertaining to a location of a first geographic area. The digital elevation model further comprises at least part of a plurality of mipmap levels which also encode elevations at pixels, corresponding to locations bordering the first geographic area. The mipmap levels are of lower resolution than the texture.

For each pixel of the texture, a first derivative and a second derivative based at least partially on the plurality of elevations encoded by pixels are determined. Also, for each pixel of the texture, an openness factor is determined, based at least in part on elevations at one or more pixels of the mipmap levels. The derivatives and openness factors are encoded in association with each pixel as part of the texture.

A hill shading factor is determined for each pixel of the texture based at least in part on the first derivative and the second derivative at the pixel. An electronic map is rendered corresponding to the first geographic area using the openness and hill shading factors of each pixel of the texture. The rendering of the electronic map is sent for display.

Figure 1:
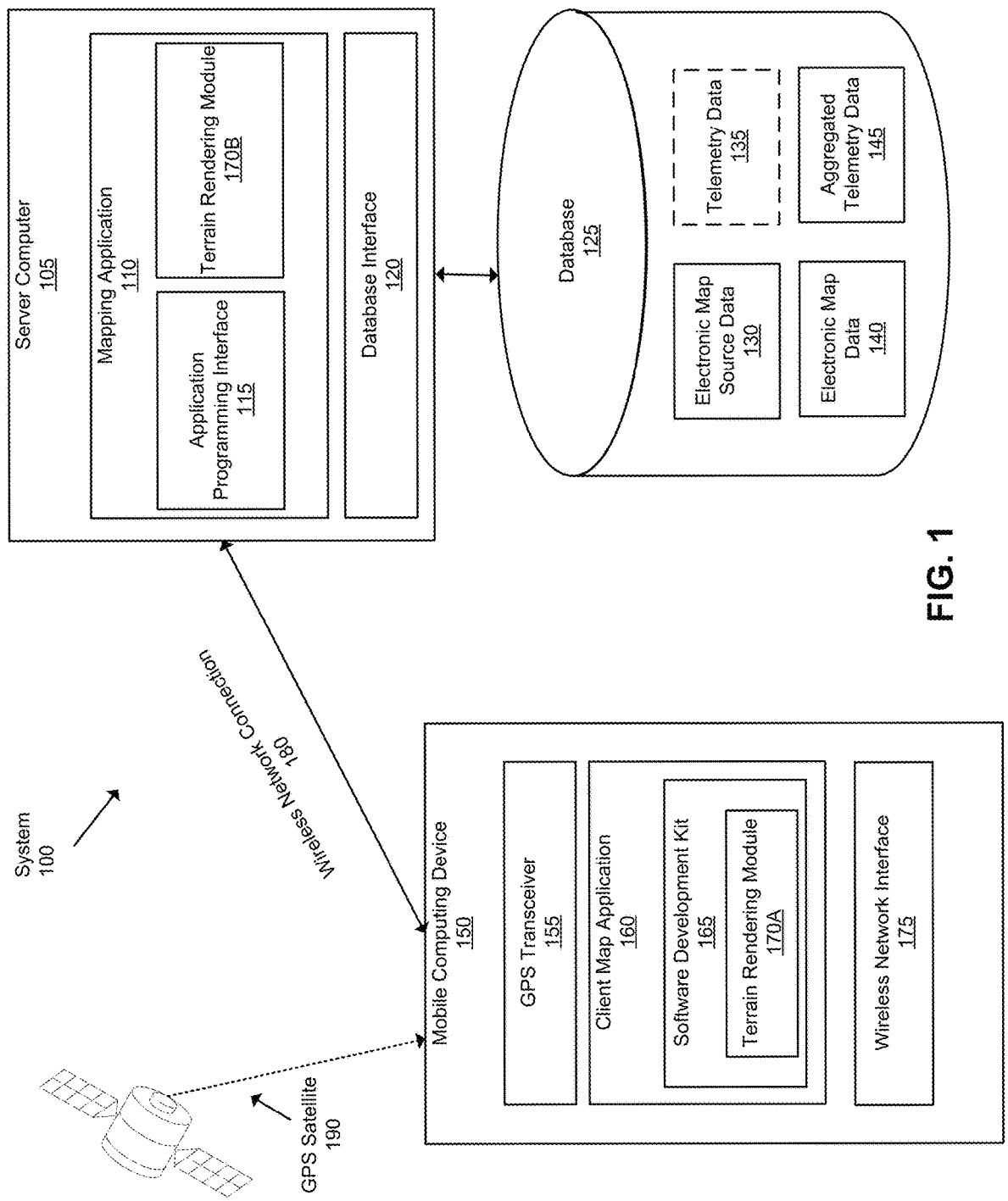
FIG. 1 illustrates an example computer system in which the techniques described may be practiced, according to one embodiment.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

I. General Overview

How to best represent terrain features on a map, especially an electronic map, is an ongoing problem. Hill shading techniques illustrate terrain elevations, but often are subjectively imperfect visual representations. Using openness techniques to improve hill shading creates a more visually intuitive electronic map, but is expensive in terms of computing resources. As detailed below, a novel approach using mipmaps improves the computational efficiency of calculating openness, thereby making openness a more feasible aspect to include in a rendering of an electronic map, particularly where rendering needs to be performed on a frequent or rapid update basis in response to an input received at the computing device.

II. Map Content Overview

In the following description, for the purposes of explanation, numerous specific details are set forth in order to provide a thorough understanding of the present invention. It will be apparent, however, that the present invention may be practiced without these specific details.

II.A. Hill Shading and Coloring

In many use cases of electronic maps it is desirable to represent geographic information in a visually pleasing and comprehensible manner. For example, if a map corresponds to a geographic area comprising hilly terrain, it can be desirable to visually represent those hills such that a user of the electronic map can easily distinguish their approximate shapes, sizes, and elevations. This can be done using coloring techniques when displaying the electronic map on a display of a mobile computing device, for example. If the electronic map is displayed using pixels, the specific colors used for each pixel can radically change how the user interprets the displayed map. For example, a person viewing an electronic map is likely to naturally consider blue portions of the map to be water and green portions to be land. Furthermore, darker areas may be considered shadowed and lighter areas may be considered in sunlight.

Hill shading, or "shaded relief," is one terrain visualization technique where terrain of varying elevation is colored based on the slopes and aspects of those elevation changes. Slope is the rate at which elevation changes and aspect is the direction of the slope. Using a color scheme based on slope and elevation allows for intuitive visual distinction of hills and other elevated terrain features. For example, certain sides of elevated terrain features are colored lighter shades, and the others darker, to mimic how the sun fails to uniformly illuminate true geographic features, with certain sides falling into shade because of the azimuth (direction) and zenith (angle relative to the horizon) of the sun.

Adding a layer of coloration, or adjusting coloration, based on the openness of each location represented by the map can further improve the visual distinctiveness and comprehensibility of elevated terrain features. Openness, for example, can be a factor used for adjustment, and is based on the amount of sky which would be visible to a person standing at a given location. In other embodiments, openness is a layer which is overlaid the hill shading layer to better distinguish elevated terrain features.

II.B. Openness

In this description, computer-implemented techniques are provided for efficiently generating terrain openness. Herein, "openness" refers to either a sky view factor, street canyon factor, urban canyon factor, openness factor, or other representation of relative elevation or "view of the sky." In general, openness is determined with respect to an origin location by identifying the points of greatest elevation in a plurality of directions, such as the four Cardinal or the eight Cardinal and inter-Cardinal directions, up to a certain distance away. For example, the terrain in the eight Cardinal and inter-Cardinal directions up to one mile away. Angles are then determined from the origin location to the identified points with respect to a horizontal plane which intersects the origin location. An average, median, or other similar aggregation of these angles is considered the "openness" or "openness factor."

In an embodiment, openness measures only positive angles, meaning angles to locations with elevations above the origin location, where angles to locations with elevations below the origin location are considered as having an angle of zero degrees. In another embodiment, all angles, including negative angles, are considered. Wide open mountain peaks, for example, will have low openness, because the identified locations of greatest elevation in the plurality of directions are of a lower elevation than the origin location. Therefore the openness will be a low number, corresponding with the opportunity for a person standing at the origin location on top of the wide open mountain peak to see almost the entirety of the sky. In contrast, if the origin location were at the bottom of a narrow gorge, for example, only a sliver of the sky would be visible. This would correspondingly have a high openness, representing the great discrepancy in elevation among the origin location and the locations of greatest elevation surrounding it, which can lead to measured angles of nearly ninety degrees.

Figure 6:
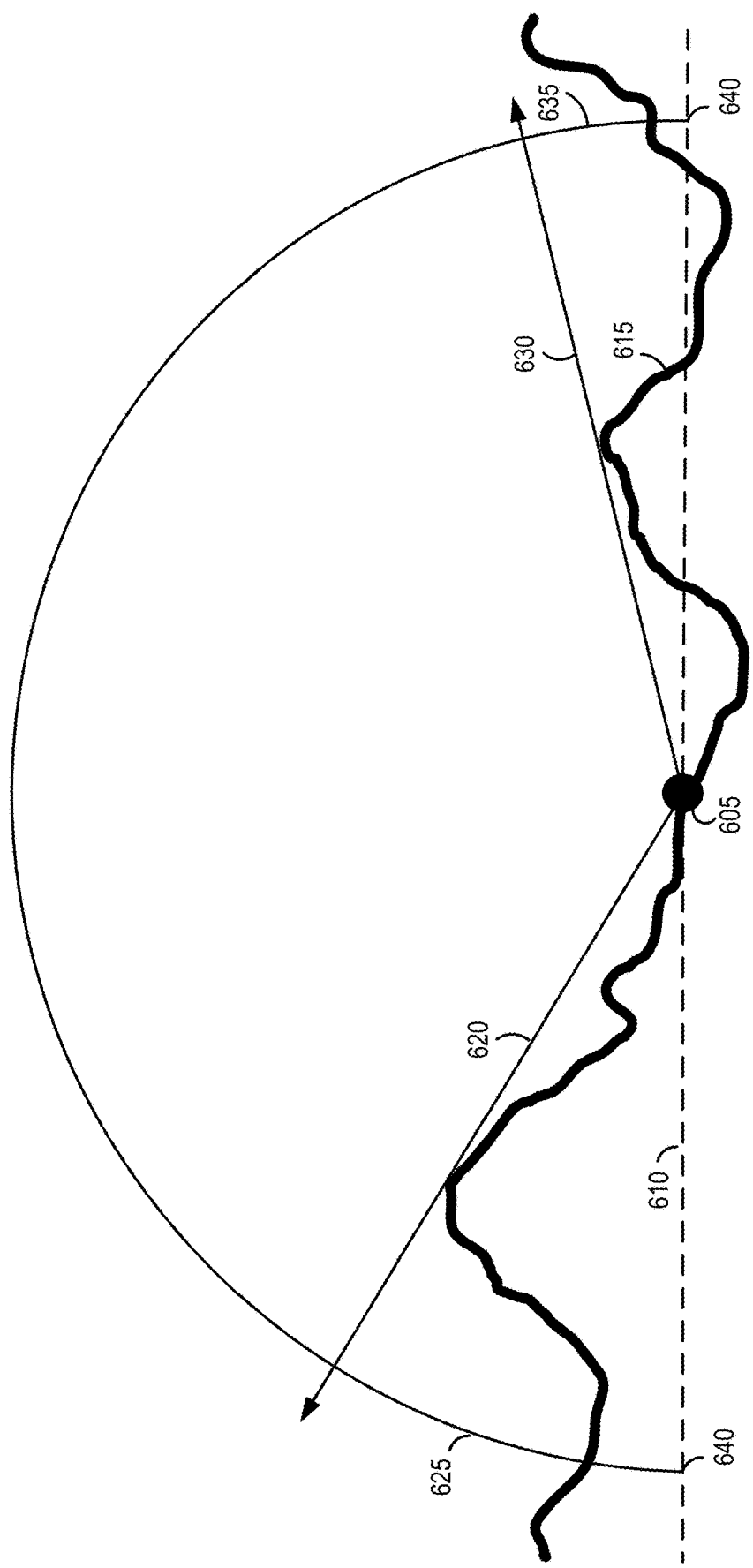
FIG. 6 is a diagram showing a simplified cross section of an example of openness, according to one embodiment.

FIG. 6 is a diagram showing a simplified cross section of an example of openness, according to one embodiment. Origin location 605 is a geographic location at an elevation equal to that of plane 610. Geographic cross section 615 is a representation of a cross section of the geography in which origin location 605 is located. As seen in the figure, the geographic cross section 615 captures terrain of varied elevations.

For the purposes of the example of the figure, openness is calculated using two angles, pertaining to two highest elevations, one to the left of the origin location 605 up to a distance 640 away and one to the right of the origin location 605 up to the same distance 640 away. A first ray 620 begins at the origin location 605 and is tangential to the left highest elevation of the figure. The resulting angle between the first ray 620 and the plane 610 in which origin location 605 lies is a first angle 625 for use in calculating openness. Similarly, a second ray 630 begins at the origin location 605 and is tangential to the right highest elevation of the figure within the distance 640 bound. The resulting angle between the second ray 630 and the plane 610 is a second angle 635 for use in calculating openness.

Openness is then determined by averaging the first angle 625 and the second angle 635. For example, if the first angle 625 is thirty degrees and the second angle 635 is twenty degrees, the openness factor would be twenty-five degrees.

Determining openness factors for use when rendering an electronic map upon a display can be expensive in terms of computing resources. For example, if each pixel of a digital elevation model of a geographic area is used as a location from which to determine an openness factor for the pixel for use when rendering an electronic map of the geographic area, those determinations may require enough computing resources and time that the quality of user interactivity diminishes. For example, if the user adjusts the electronic map to display a different geographic area, rendering the different area may take enough time that the user becomes frustrated with the sluggish responsiveness of the electronic map.

Computing resources may comprise one or more computer processors operating within one or more computing devices. Executing instructions for actions such as determining openness factors may require a certain amount of usage of a computer processor. In an embodiment, execution of actions requires a certain number of processor clock cycles, which may be performed by one processor, or by splitting the execution among two or more processors. Computing resources may also comprise space upon random access memory (RAM) or other electronic storage mediums such as hard drives. Other examples of computing resources include network throughput, input and/or output operability, and electrical power. Depending upon the embodiment, one or more of the above exemplary computing resources may comprise the computing resources used. The various computing resources described herein are not intended to be an exhaustive account. Persons skilled in the relevant art can appreciate that others are possible in light of this disclosure, for example, one or more aspects of the computer system described in relation to FIG. 2.

II.C. Digital Elevation Models (DEMs)

A digital elevation model (DEM) is an electronic representation of a terrain's surface based on the terrain's elevation data. A DEM includes a texture having a number of pixels representing a geographic area, where each pixel encodes an elevation value of a location within the geographic area. The DEM can also include one or more mipmap levels of the geographic area. In various embodiments, the DEM further includes mipmaps or portions of mipmaps encoding elevation values of geographic areas bordering the geographic area of the texture. For example, a portion of a mipmap could be a subset of the total pixels of a mipmap level. Herein, when referring to a mipmap, it is understood that this may refer to a full mipmap, one or more mipmap levels, or portions of one or more mipmap levels.

Mipmaps are sequences of textures, each texture of the sequence referred to as a level, each of which is progressively lower in resolution than the previous level but representing the same image. For example, a level zero is the full resolution texture, a level one is a half resolution texture, a level two is a quarter resolution texture, and so on.

Figure 5:
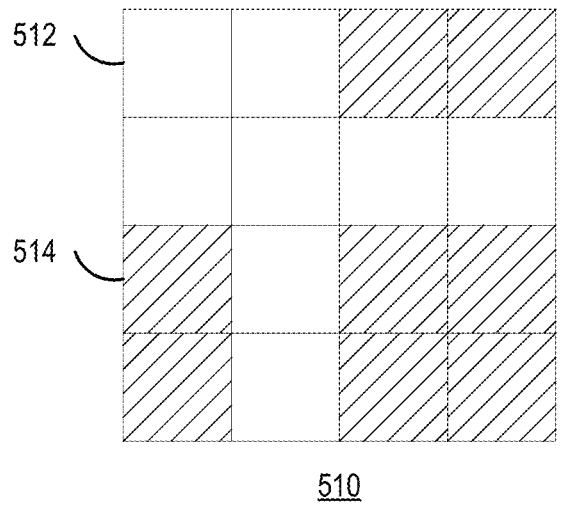
FIG. 5 is a diagram showing a simplified example of mipmap levels according to one embodiment.
Figure 5:
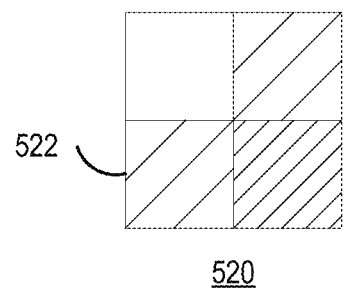
Figure 5:
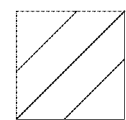

FIG. 5 is a diagram showing a simplified example of mipmap levels according to one embodiment. First mipmap level 510 is a texture comprising a four by four grid of pixels. White pixel 512 occupies the topmost and leftmost location of the grid and colored pixel 514 occupies a location on the grid two below white pixel 512. In the figure, diagonal lines, such as those of darkly colored pixel 514, represent an amount of coloration; a greater number of diagonal lines corresponds with darker color, while a fewer number of lines corresponds with lighter color. As seen in the figure, the first mipmap level 510 comprises eight white pixels and eight darkly colored pixels which are unevenly distributed about the grid. This example is not specific, but in an example embodiment where the pixels of the underlying texture are from DEM, color may correspond to elevation or some other property relevant to electronic maps.

Second mipmap level 520 represents a mipmap level one above that of the first mipmap level 510. Second mipmap level 520 is a lower resolution version of the first mipmap level 510 and comprises a two by two grid of pixels. Each pixel of the second mipmap level 520 corresponds to a quadrant of the first mipmap level 510 and is colored based on the colors of the pixels of its quadrant, for example the average color of its quadrant.

The top left pixel of the second mipmap level 520 is white because the four pixels it corresponds to in the first mipmap level 510 are all white, so the average color is white. Likewise, the bottom right pixel of the second mipmap level 520 is darkly colored because the four pixels of its bottom right quadrant of the first mipmap level 510 are all darkly colored. The upper right and bottom left pixels of the second mipmap level 520 are lightly colored because the pixels of their respective quadrants are a combination of white pixels and darkly colored pixels, making the average color thereof a lighter color. As such, each pixel of the second mipmap level 520 represents some aggregate representation the relative amounts of white and darkly colored pixels in their quadrants at the higher resolution first mipmap level 510.

Third mipmap level 530 represents a mipmap level one above that of the second mipmap level 520 and is of lower resolution than the second mipmap level 520, comprising one pixel. The pixel is the average color of the four pixels which make up the second mipmap level 520, and thus is lightly colored. This represents the lightly colored pixels and even mixture of white and darkly colored pixels of the second mipmap level 520, and by extension the even mixture of white and darkly colored pixels of the first mipmap level 510.

The pixels of each mipmap level encode compressed representations of the pixel data of a previous mipmap level. For example, they may encode the average or median elevation of the pixels of a higher mipmap level. If white pixel 512 encoded an elevation of 100 feet, for example, and the three pixels of the first mipmap level 510 that border it each encode 0 feet, then a corresponding pixel representing those four pixels at the second mipmap level 520 would encode an elevation of 25 feet, the average of the four elevations. Alternatively, the pixel at the second mipmap level could encode the greatest elevation of the four, and as such encode 100 feet.

Generally, the section of a lower mipmap level which a pixel represents is a group of pixels spatially located on the grid at a location similar to the location of the representative pixel on the higher mipmap level. The number of pixels represented by a single pixel at a higher mipmap level is based on the relative resolution of the two mipmap levels. For example, as in FIG. 5, if each higher mipmap level is of a resolution half the width and half the height of the last, then each pixel of the higher mipmap level represents four pixels of the last, due to there being one fourth the number of pixels in the higher mipmap level.

III. Computing Environment

FIG. 1 illustrates an example computer system in which the techniques described may be practiced, according to one embodiment. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 uses like reference numerals to identify like elements. A letter after a reference numeral, such as "170A," indicates that the text refers specifically to the element having that particular reference numeral. A reference numeral in the text without a following letter, such as "170," refers to any or all of the elements in the figures bearing that reference numeral. For example, "170" in the text refers to reference numerals "170A," and/or "170C" in the figures.

FIG. 1 illustrates a mobile computing device 150 that is coupled via a wireless network connection 180 to a server computer 105, which is coupled to a database 125. A GPS satellite 190 is coupled via a wireless connection to the mobile computing device 150. The server computer 105 comprises a mapping application 110, an application programming interface (API) 115, and a database interface 120. The database 125 comprises electronic map source data 130, electronic map data 140, telemetry data 135, and aggregated telemetry data 145. The mobile computing device 150 comprises a GPS transceiver 155, client map application 160, software development kit (SDK) 65, terrain rendering module 170, and wireless network interface 175.

III.A. Server and Database

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 125 and mobile computing device 150 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 120, to facilitate various aspects of embodiments described herein.

In one embodiment, database interface 120 is a programmatic interface such as JDBC or ODBC for communicating with database 125. Database interface 120 may communicate with any number of databases and any type of database, in any format. Database interface 120 may be a piece of custom software created by an entity associated with mapping application 110, or may be created by a third party entity in part or in whole.

In one embodiment, database 125 is a data storage subsystem consisting of programs and data that is stored on any suitable storage device such as one or more hard disk drives, memories, or any other electronic digital data recording device configured to store data. Although database 125 is depicted as a single device in FIG. 1, database 125 may span multiple devices located in one or more physical locations. For example, database 125 may include one or more nodes located at one or more data warehouses. Additionally, in one embodiment, database 125 may be located on the same device or devices as server computer 105. Alternatively, database 125 may be located on a separate device or devices from server computer 105.

Database 125 may be in any format, such as a relational database, a noSQL database, or any other format. Database 125 is communicatively connected with server computer 105 through any kind of computer network using any combination of wired and wireless communication of the type previously described. Optionally, database 125 may be communicatively connected with other components, either directly or indirectly, such as one or more third party data suppliers. Generally, database 125 stores data related to electronic maps including, but not limited to: electronic map source data 130, electronic map data 140, telemetry data 135, and aggregated telemetry data 145. These datasets may be stored as columnar data in a relational database or as flat files.

In one embodiment, electronic map source data 130 is raw digital map data that is obtained, downloaded or received from a variety of sources. The raw digital map data may include satellite images, digital street data, building or place data or terrain data. Terrain data can include elevations of various geographic locations in the terrain. Example sources include National Aeronautics and Space Administration (NASA), United States Geological Survey (USGS), and DigitalGlobe. Electronic map source data 130 may be updated at any suitable interval, and may be stored for any amount of time. Once obtained or received, electronic map source data 130 is used to generate electronic map data 140.

In one embodiment, electronic map data 140 is digital map data that is provided, either directly or indirectly, to client map applications, such as client map application 160, using an API. Electronic map data 140 is based on electronic map source data 130. Specifically, electronic map source data 130 is processed and organized as a plurality of vector tiles which may be subject to style data to impose different display styles. Electronic map data 140 may be updated at any suitable interval, and may include additional information beyond that derived from electronic map source data 130. For example, using aggregated telemetry data 135, discussed below, various additional information may be stored in the vector tiles, such as traffic patterns, turn restrictions, detours, common or popular routes, speed limits, new streets, and any other information related to electronic maps or the use of electronic maps. In an embodiment, terrain data that includes elevations is processed to produce a DEM.

In one embodiment, telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 145.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

In one embodiment, aggregated telemetry data 145 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 135 is stored in association with one or more tiles related to electronic map data 140. Aggregated telemetry data 145 may be stored for any amount of time, such as a day, a week, or more. Aggregated telemetry data 145 may be further processed or used by various applications or functions as needed.

III.B. Mobile Computing Device

In one embodiment, mobile computing device 150 is any mobile computing device, such as a laptop computer, handheld computer, wearable computer, cellular or mobile phone, portable digital assistant (PDA), or tablet computer. Alternatively, mobile computing device 150 could be a desktop computer or an interactive kiosk. Although a single mobile computing device is depicted in FIG. 1, any number of mobile computing devices may be present. Each mobile computing device 150 is communicatively connected to server computer 105 through wireless network connection 180 which comprises any combination of a LAN, a WAN, one or more internetworks such as the public Internet, a cellular network, or a company network.

Mobile computing device 150 is communicatively coupled to GPS satellite 190 using GPS transceiver 155. GPS transceiver 155 is a transceiver used by mobile computing device 150 to receive signals from GPS satellite 190, which broadly represents three or more satellites from which the mobile computing device may receive signals for resolution into a latitude-longitude position via triangulation calculations.

Mobile computing device 150 also includes wireless network interface 175 which is used by the mobile computing device to communicate wirelessly with other devices. In particular, wireless network interface 175 is used to establish wireless network connection 180 to server computer 105. Wireless network interface 175 may use WiFi, WiMAX, Bluetooth, ZigBee, cellular standards or others.

Mobile computing device 150 also includes terrain rendering module 170A which is used by the mobile computing device as part of the client map application 160 to provide terrain rendering functionality. In some embodiments terrain rendering module 170A collaborates with terrain rendering module 170B of the server computer 105 to provide terrain rendering functionality. Alternatively, either terrain rendering module 170A or terrain rendering module 170B solely provides terrain rendering module functionality, in which case the other module may not be present in the system.

Mobile computing device 150 also includes other hardware elements, such as one or more input devices, memory, processors, and the like, which are not depicted in FIG. 1. Mobile computing device 150 also includes applications, software, and other executable instructions to facilitate various aspects of embodiments described herein. These applications, software, and other executable instructions may be installed by a user, owner, manufacturer, or other entity related to mobile computing device 150. In one embodiment, mobile computing device 150 includes client map application 160 which is software that displays, uses, supports, or otherwise provides electronic mapping functionality as part of the application or software. Client map application 160 may be any type of application, such as a taxi service, a video game, a chat client, a food delivery application, etc. In an embodiment, client map application 160 obtains electronic mapping functions through SDK 165, which may implement functional calls, callbacks, methods or other programmatic means for contacting the server computer to obtain digital map tiles, layer data, or other data that can form the basis of visually rendering a map as part of the application. In general, SDK 165 is a software development kit that allows developers to implement electronic mapping without having to design all of the components from scratch. For example, SDK 165 may be downloaded from the Internet by developers, and subsequently incorporated into an application which is later used by individual users.

In server computer 105, the mapping application 110 provides the API 115 that may be accessed, for example, by client map application 160 using SDK 165 to provide electronic mapping to client map application 160. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 145, receiving electronic map source data 130 from data providers, processing electronic map source data 130 to generate electronic map data 140, and any other aspects of embodiments described herein. Mapping application 110 includes terrain rendering module 170B which may be used to enable terrain rendering functionality on client map application 160. Depending upon the embodiment, terrain rendering functionality may be provided wholly on the mobile computing device 150 via terrain rendering module 170A, wholly on the server computer 105 via terrain rendering module 170B, or in part by each terrain rendering module 170 working in conjunction.

III.C. Hardware Environment

According to one embodiment, the techniques described herein are implemented by one or more special-purpose computing devices. For example, the server computer 105 and mobile computing device 150 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2:
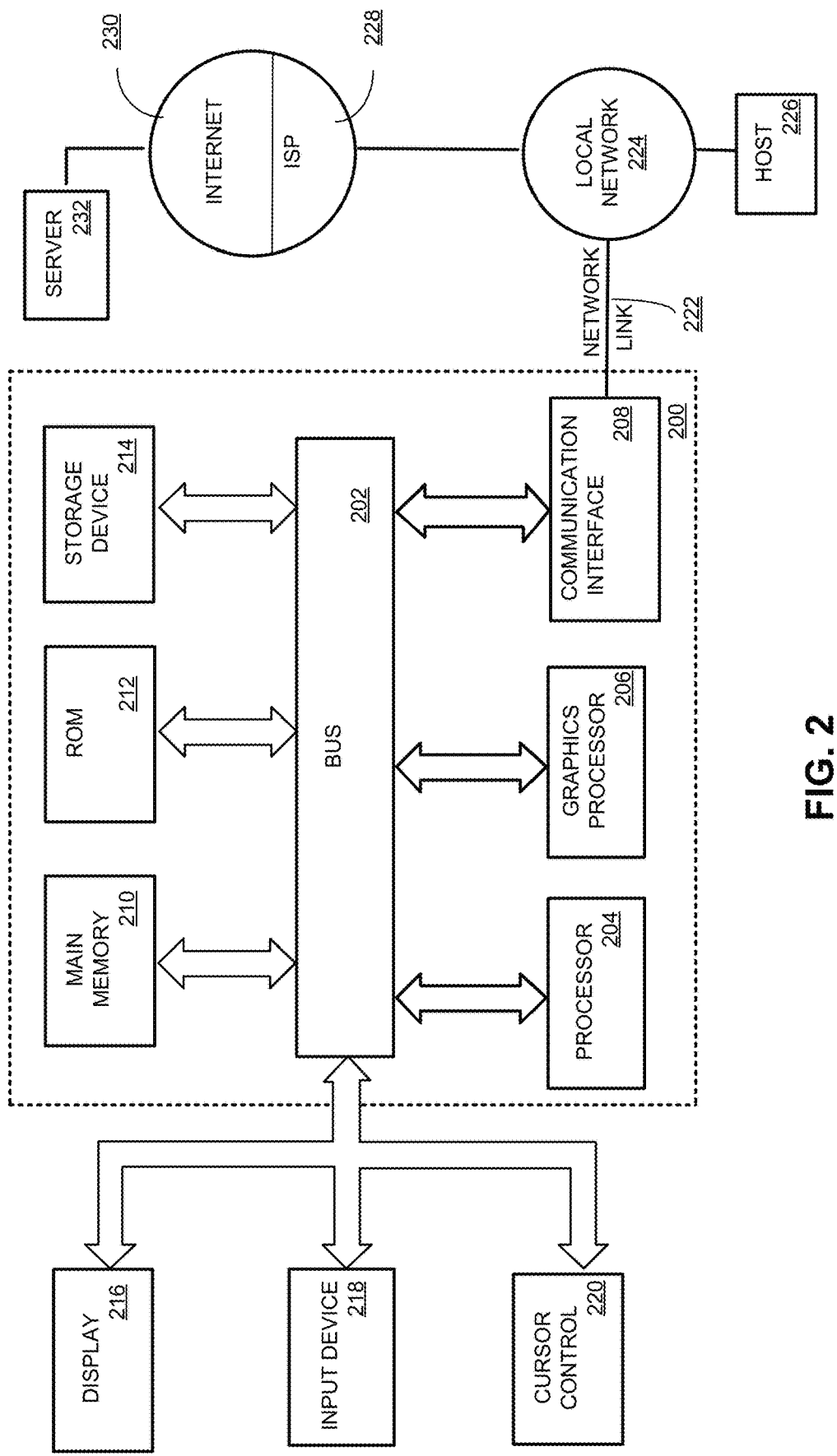
FIG. 2 is a block diagram that illustrates a computer system with which the described embodiments may be implemented.

For example, FIG. 2 is a block diagram that illustrates a computer system 200 with which the described embodiments may be implemented. Computer system 200 includes a bus 202 or other communication mechanism for communicating information, and a hardware processor (CPU) 204 and graphics processor (GPU) 206 coupled with bus 202 for processing information. CPU 204 may be, for example, a general purpose microprocessor. GPU 206 may be, for example, a graphics processing unit with a high core count which is optimized for parallel processing and graphics rendering.

Computer system 200 also includes a main memory 210, such as a random access memory (RAM) or other dynamic storage device, coupled to bus 202 for storing information and instructions to be executed by CPU 204. Main memory 210 also may be used for storing temporary variables or other intermediate information during execution of instructions to be executed by CPU 204 and/or GPU 206. Such instructions, when stored in non-transitory storage media accessible to CPU 204 and/or GPU 206, render computer system 200 into a special-purpose machine that is customized to perform the operations specified in the instructions.

Computer system 200 further includes a read only memory (ROM) 212 or other static storage device coupled to bus 202 for storing static information and instructions for CPU 204 and/or GPU 206. A storage device 214, such as a magnetic disk or optical disk, is provided and coupled to bus 202 for storing information and instructions.

Computer system 200 may be coupled via bus 202 to a display 216, such as an LCD screen, LED screen, or touch screen, for displaying information to a computer user. An input device 218, which may include alphanumeric and other keys, buttons, a mouse, a touchscreen, and/or other input elements is coupled to bus 202 for communicating information and command selections to CPU 204 and/or GPU 206. In some embodiments, the computer system 200 may also include a cursor control 220, such as a mouse, a trackball, or cursor direction keys for communicating direction information and command selections to CPU 204 and/or GPU 206 and for controlling cursor movement on display 216. The cursor control 220 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to CPU 204 and/or GPU 206 executing one or more sequences of one or more instructions contained in main memory 210. Such instructions may be read into main memory 210 from another storage medium, such as storage device 214. Execution of the sequences of instructions contained in main memory 210 causes CPU 204 and/or GPU 206 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 214. Volatile media includes dynamic memory, such as main memory 210. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to CPU 204 and/or GPU 206 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 210, from which CPU 204 and/or GPU 206 retrieves and executes the instructions. The instructions received by main memory 210 may optionally be stored on storage device 214 either before or after execution by CPU 204 and/or GPU 206.

Computer system 200 also includes a communication interface 208 coupled to bus 202. Communication interface 208 provides a two-way data communication coupling to a network link 222 that is connected to a local network 224. For example, communication interface 208 may be an integrated services digital network (ISDN) card, cable modem, satellite modem, or a modem to provide a data communication connection to a corresponding type of telephone line. As another example, communication interface 208 may be a local area network (LAN) card to provide a data communication connection to a compatible LAN. Wireless links may also be implemented. In any such implementation, communication interface 208 sends and receives electrical, electromagnetic or optical signals that carry digital data streams representing various types of information.

Network link 222 typically provides data communication through one or more networks to other data devices. For example, network link 222 may provide a connection through local network 224 to a host computer 226 or to data equipment operated by an Internet Service Provider (ISP) 228. ISP 228 in turn provides data communication services through the world wide packet data communication network now commonly referred to as the "Internet" 230. Local network 224 and Internet 230 both use electrical, electromagnetic or optical signals that carry digital data streams. The signals through the various networks and the signals on network link 222 and through communication interface 208, which carry the digital data to and from computer system 200, are example forms of transmission media.

Computer system 200 can send messages and receive data, including program code, through the network(s), network link 222 and communication interface 208. In the Internet example, a server 232 might transmit a requested code for an application program through Internet 230, ISP 228, local network 224 and communication interface 208. The received code may be executed by CPU 204 and/or GPU 206 as it is received, and stored in storage device 214, or other non-volatile storage for later execution.

IV. GPU Preprocessing

IV.A. Mipmap Generation

Figure 3:
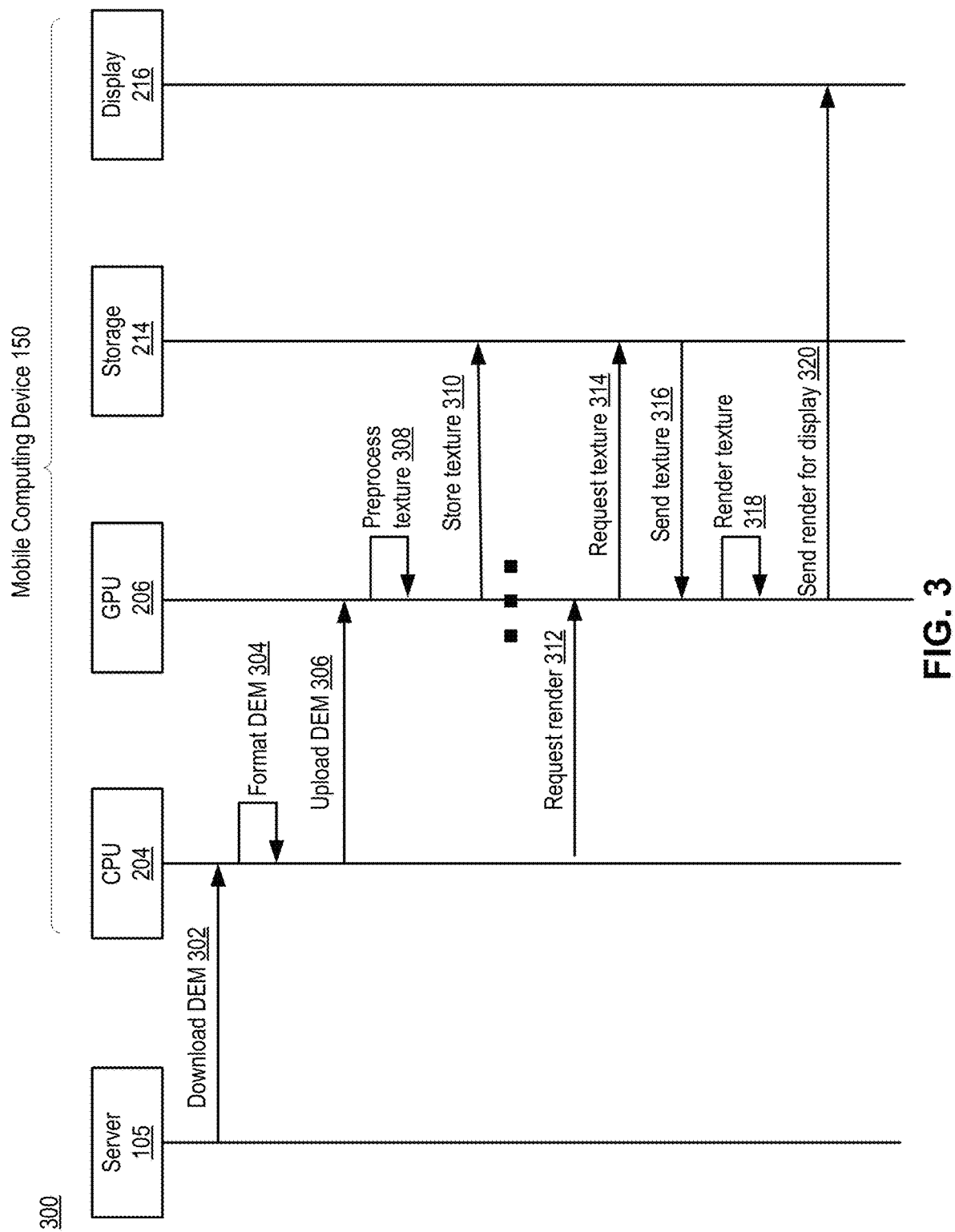
FIG. 3 is a flow diagram illustrating interactions among entities of FIG. 1 to enable efficient generation of terrain openness, according to one embodiment.

With respect to the terrain rendering module 170 specifically, the terrain rendering module 170 interacts with other components of the system to provide efficient generation of terrain openness. FIG. 3 is a flow diagram 300 illustrating interactions among entities of FIG. 1 to enable efficient generation of terrain openness, according to one embodiment. The mobile computing device 150 downloads 302 a DEM from the server 105. The DEM includes a first texture representing the elevations of locations within a geographic area, and in various embodiments additionally includes mipmaps, representing the elevations of locations within the geographic area of the first texture and geographic areas bordering the geographic area of the first texture.

Depending on the implementation, either the server 105 or the mobile computing device preprocesses the first texture and bordering textures to generate the mipmaps for inclusion as part of the DEM if they have not already been generated. The server 105 (or mobile computing device 150) generates the mipmap levels and packages them with the first texture as part of the DEM such that a reading of an elevation beyond the borders of the first texture instead reads from an appropriate pixel of one of the mipmaps, based on the relative geographic locations represented by the pixels of the first texture and the mipmaps, and such that a reading of an elevation within the borders of the first texture instead reads from an appropriate pixel of one of the mipmap levels of the first texture based on the represented geographic location In one embodiment, only portions of mipmaps are packaged with the first texture. For example, only certain levels or portions of levels may be packaged with the first texture into the DEM. For example, portions of mipmap levels are packaged based on a distance from the edges of the first texture. As a specific example of this: a level zero portion of a mipmap a single pixel wide bordering around the first texture may be packaged along with a level one portion of a mipmap a single pixel wide bordering the level zero mipmap, and so on. Such bordering by single pixel wide portions of levels of mipmaps may continue with additional levels, representing further distances from the edges of the first texture. As each more distant mipmap portion is of a lower level, it encompasses a greater geographic area per pixel, and also comprises fewer pixels total. An example of this is illustrated by FIG. 9.

Figure 9:
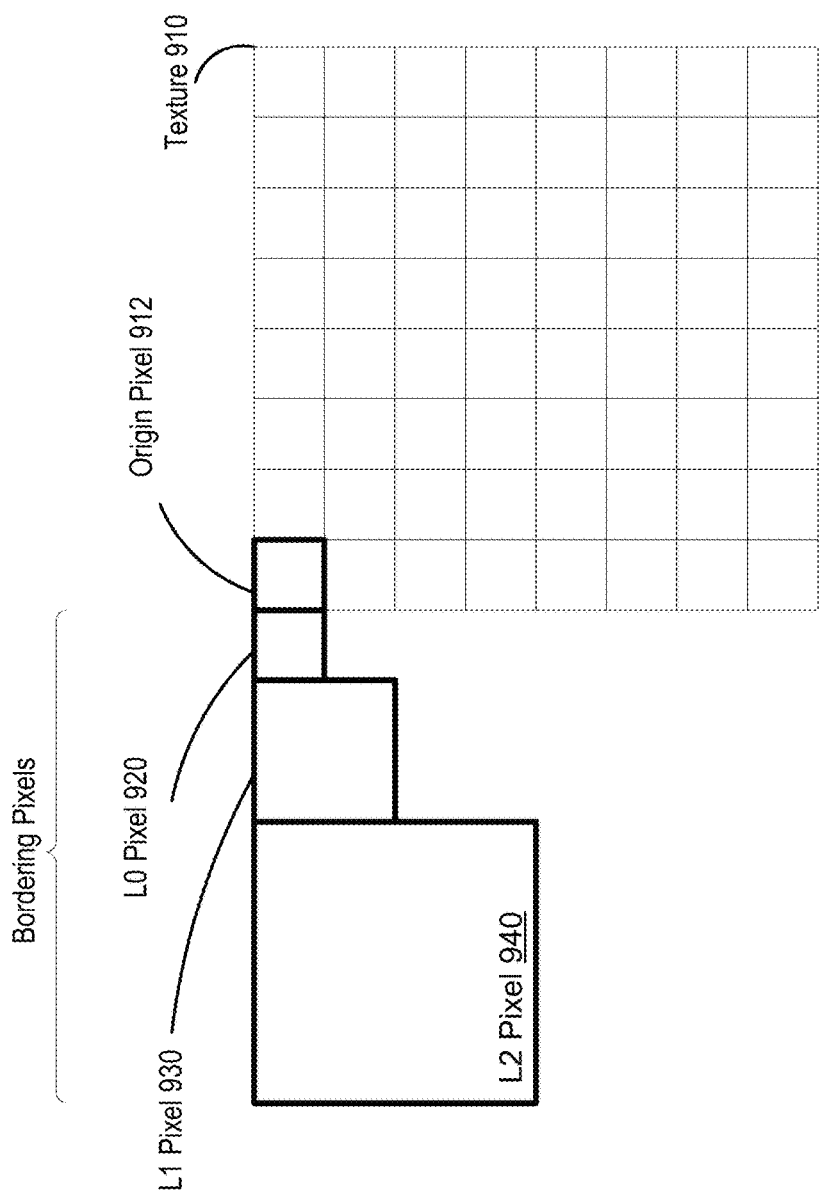
FIG. 9 is a diagram showing an exemplary use of mipmaps to determine openness, according to one embodiment.

FIG. 9 is a diagram showing an exemplary use of mipmaps to do determine openness, according to one embodiment. There is a DEM 900 including an 8 pixel by 8 pixel texture 910 including origin pixel 912. Illustrated to the left of the texture 910 are bordering pixels for use in determining openness for the origin pixel 912. Each bordering pixel is from a different mipmap level of a border texture that borders the texture 910 to the left. There is a level 0 (L0) pixel 920, a level 1 (L1) pixel 930, and a level 2 (L2) pixel 940. For the sake of clarity the figure illustrates only certain pixels involved in the exemplary openness calculation for origin pixel 912, though other pixels, such as additional L0 pixels from the border texture, could be included in the DEM 900. Also for the sake of clarity, each successive level's pixel is illustrated as larger than the previous, to illustrate that a pixel of each successive level represents more terrain than a pixel of a previous level. For example, the L1 pixel 920 represents four times as much terrain as the L0 pixel 920 or the origin pixel 912 (pixels in the texture 910 are L0 pixels of the texture 910).

As detailed above in subsection II.B, determining an openness factor involves determining a greatest elevation in each of a plurality of directions. The bordering pixels in FIG. 9 are for determining a point of greatest elevation to the left of the origin pixel 912 up to a distance represented by 4 L0 pixels away from the origin pixel 912. In other embodiments more or fewer pixels are used when determining a greatest elevation in a given direction. The number of pixels from bordering mipmap levels used for an openness calculation is given by:

$$\log_2(\text{radius})+1$$

where the radius is the number of L0 pixels in a given direction that represents the distance to which each direction is examined for the openness calculation. Because FIG. 9 uses a radius of 4 L0 pixels, three bordering mipmap levels (L0, L1, and L2) are used. An elevation from each bordering pixel is used when determining a greatest elevation to the left of the origin pixel. As such a greatest elevation value is determined from among three elevations, rather than four (the number of L0 pixels in the radius, which is the number of L0 pixels from the bordering texture that would be used if pixels from other mipmap levels were not instead used). In an embodiment, linear interpolation is used to determine elevation values. For example, the radius of 4 L0 pixels terminates one quarter of the way into the L2 pixel 940. As such, rather than use the L2 pixel's 940 encoded elevation, an elevation may be determined for the L2 pixel by linear interpolation using a fractional coordinate a quarter of the way into the L2 pixel 940 from an adjacent L2 pixel, resulting in an elevation different than that encoded at the L2 pixel 940.

Because higher mipmap levels represent greater geographic area, fewer pixels total are necessary to capture the same distance captured by four L0 pixels (in this case, 3 pixels of various mipmap levels, instead of 4 L0 pixels). Using fewer elevations saves computing resources as fewer have to be read and compared with one another. For openness calculations with greater radii this efficiency benefit is even more pronounced. For example, if the radius were 64 pixels, only seven elevations would be used (as confirmed by the above equation), from seven mipmap levels, rather than 64 elevations from 64 L0 pixels of one or more bordering textures. Furthermore, by using portions of mipmap levels rather than the full resolution L0 bordering texture, far fewer additional pixels are stored with the texture 910. For example, if bordering 8 pixel by 8 pixel textures were stored with the texture 910 to enable openness calculations for edge pixels of the texture 910 that require using pixels outside the texture 910, for each Cardinal direction, 256 additional pixels (four 8 pixel by 8 pixel border textures) would be stored in addition to the texture 910. However, using pixels from mipmaps, only 56 pixels are stored in addition to the texture 910 (32 L0 pixels, 16 L1 pixels, and 8 L2 pixels). When determining openness for pixels not on an edge of the texture 910, pixels from mipmap levels of the texture 910 itself are used, sometimes in conjunction with bordering pixels if one or more radii would extend beyond edges of the texture 910.

In sum, by using only portions of levels of mipmaps for elevations of geographic locations bordering the geographic area of the texture, significant processing and storage space is saved, both by requiring fewer determinations and by lessening the amount of data which must be stored. For example, a texture using full resolution bordering textures for openness calculations of edge and near-edge pixels would require storing and using orders of magnitude more pixels than if only the texture and portions of bordering mipmap levels are stored.

IV.B. GPU Handling

Returning to FIG. 3, the CPU 204 may first format 304 the DEM before handing off the DEM to the GPU. The CPU 204 may format the DEM by mapping locations of one mipmap to adjacent locations of another mipmap. For example, a second mipmap portion half the resolution of a first mipmap portion. The second mipmap portion has half as many pixels in length and width, and its representative data is scaled accordingly. As such, one pixel of the second mipmap portion represents a geographic area equal in length and width to four pixels of the first mipmap portion. As such, a measurement extending into both mipmap levels passing through two pixels of the first mipmap portion will continue into the one pixel of the second mipmap portion. Such relationships based on relative geographic area may be formatted into the DEM. In an embodiment, the server 105 does this before the CPU downloads 302 the DEM. The CPU 204 transmits 306 the DEM to the GPU 206. For example, the CPU 204 stores the mipmaps in appropriate locations within memory of the GPU 206 based on the level of each mipmap such that the GPU 206 may make use of built-in mipmap handling functionality. The texture of the DEM is stored within the GPU 206 at an appropriate location as well (e.g., within dedicated RAM available to the GPU). In an alternate embodiment, the server 105 performs the preprocessing instead.

The GPU 206 preprocesses 308 the texture by calculating derivatives and openness factors for each pixel of the texture. Preprocessing 308 is described in more detail with respect to FIG. 4. Upon preprocessing 308 of the texture, the texture is stored 310 in storage 214 upon the mobile computing device 150. The texture is kept in storage 214 for an indeterminate amount of time, until rendering of the texture is requested 312 by the CPU 204. In an embodiment, the server 105 performs the preprocessing instead.

Upon receipt of a render request, the GPU 206 requests 314 the texture from storage 214. Storage 214 sends 316 the texture to the GPU 206 where it is again stored at an appropriate location in memory of the GPU 206 to allow the GPU 206 use of the texture. The GPU renders 318 the texture, as described in detail with reference to FIG. 7. Upon rendering, the render is sent 320 for display to the display 216 of the mobile computing device 150.

IV.C. Openness Preprocessing

Figure 4:
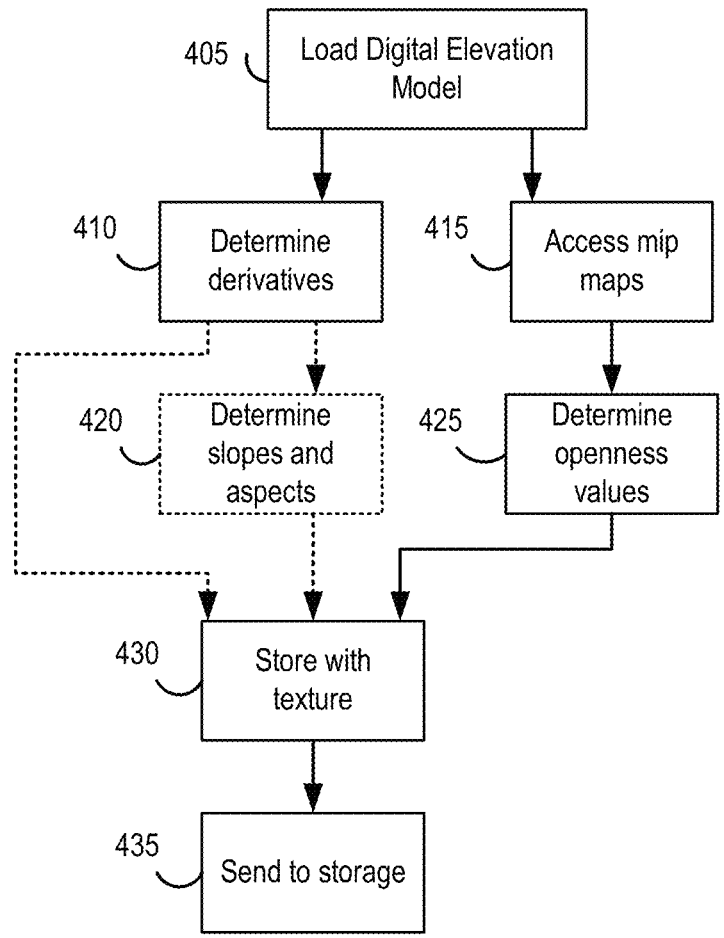
FIG. 4 is a flowchart illustrating a method to preprocess openness, according to one embodiment.

FIG. 4 is a flowchart 400 illustrating a method to preprocess openness, according to one embodiment. The flowchart 400 comprises two paths by which preprocessing may be done, depending upon the embodiment, as designated by dashed lines. The GPU 206 loads 405 the DEM. For example, the GPU 206 moves the DEM and preprocessing instructions into memory, and loads the appropriate mipmaps. In an embodiment, loading 405 is done beforehand. Some steps of the method may be performed simultaneously depending upon the embodiment, for example, determining derivatives and openness values.

The GPU 206 determines 410 a first derivative and a second derivative for each pixel. Determining 410 a derivative involves accessing the elevations to two directional "sides" of a pixel. The first derivative, for example, could be a slope on a West-East axis in terms of the terrain represented by the pixels, and the second derivative could be a slope on a North-South axis. Generally, each pixel of the texture has eight border pixels, in each Cardinal and inter-Cardinal direction. For the example first derivative, determination may involve accessing the elevations encoded at the three border pixels to the left and the three border pixels to the right and determining a rate of elevation difference among them with regard to the elevation encoded at the pixel for which the derivative is being determined. For example, referring to each border pixel by its Cardinal or inter-Cardinal direction, the three border pixels to the left may be the North-West, West, and South-West pixels. For the second derivative, determination may involve accessing the elevations encoded at the three border pixels above and below, or North and South, and determining a rate of elevation difference among them with regard to the elevation encoded at the pixel for which the derivative is being determined. In one embodiment, left and right, or above and below, average elevations are determined; the difference between the two average elevations divided by the geographic distance between the locations represented by the two Cardinal border pixels is the derivative.

In an embodiment, the GPU 206 stores 430 derivatives in association with the corresponding pixel. This may be accomplished as encoding the derivatives as part of the pixel of the texture. For example, if a pixel is capable of encoding three values, R, G, and B, the first derivative may be encoded at R and the second derivative may be encoded at G, with the elevation value stored at B.

Alternatively, in another embodiment, the GPU 206 determines 420 slopes and aspects for each pixel which are encoded at the pixel, or with the texture, instead of the derivatives. A slope of a pixel may be determined by:

$$\text{slope} = \text{atan}(\text{factor} * \sqrt{dx^2 + dy^2})$$

where the factor is a preselected constant, dx is the first derivative and dy is the second derivative.

An aspect of a pixel may be determined by:

$$\text{aspect} = \text{atan}(dy, -dx)$$

if the first derivative is nonzero. If the first derivative is zero and the second derivative is positive, the aspect is $\pi/2$. Otherwise the aspect is $-\pi/2$.

=Regardless of whether derivatives or slopes and aspects are encoded in association with the texture, the GPU 206 accesses 415 the mipmap levels of the DEM and uses them as part of determining 425 openness values. Determining an openness value, as detailed supra, involves identifying a location of greatest elevation up to a certain distance away in a plurality of directions. For a pixel of the texture, this comprises comparing pixels in each of a plurality of directions with each other and identifying a pixel of greatest elevation value in each direction. For example, three pixels directly to the right of a first pixel may be of elevation values 100, 120, and 105. The pixel with elevation 120 would be identified as the pixel of greatest elevation in that direction and would be used for the openness calculation.

In an embodiment, the openness factor determined for each pixel of the texture is encoded at the pixel in a value not used by the derivatives or slope and aspect. For example, if for each pixel slope (or first derivative) is encoded in R and aspect (or second derivative) is encoded in G, openness may be encoded in B. In other embodiments, openness factors are stored in association with pixels of the texture rather than at them.

After calculating openness and storing it in association with the pixels of the texture, the texture is sent 435 for storage 214.

V. GPU Rendering

Figure 7:
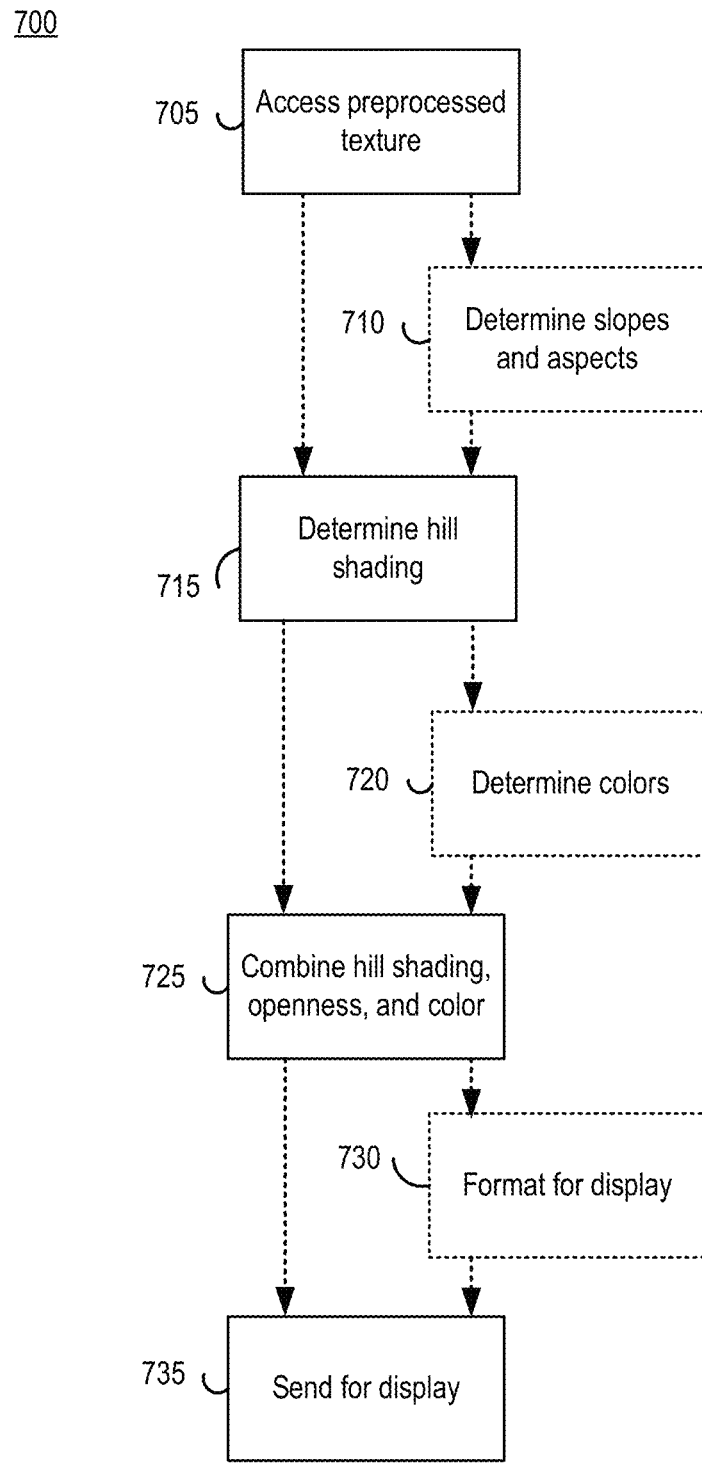
FIG. 7 is a flowchart illustrating a method to render hill shading with openness, according to one embodiment.

FIG. 7 is a flowchart illustrating a method to render hill shading with openness, according to one embodiment. The GPU 206 accesses 705 the preprocessed texture from storage 214. If the texture encodes derivatives, the slope and aspect of each pixel is determined 710, as detailed supra. In an embodiment, for each pixel, the associated derivatives are overwritten by the slope and aspect. In another embodiment, the associated derivatives are deleted and the slope and aspect are associated with the pixel.

The GPU determines 715 hill shading for each pixel. In an embodiment, determining hill shading for a pixel involves a zenith, an azimuth, a slope, and an aspect. For example, the hill shading for a pixel may be determined by:

$$\cos(\text{zenith})*\cos(\text{slope})*\sin(\text{zenith})*\sin(\text{slope})*\cos(\text{azimuth}-\text{aspect})$$

Where the zenith and azimuth are variables which depend upon a direction of lighting. In some embodiments, the openness may be a factor in the hill shading determination. In other embodiments, the openness is combined with the hill shading after it is determined, for example, to determine an overall shading for pixels of an electronic map to be used to augment the map by improving the visualization of elevated terrain features. In an embodiment, linear interpolation is applied to the shading to decrease tonal gradients between adjacent pixels and thereby improve the visualization.

If the electronic map is a color map, colors are determined 720 for the texture. These may be based on a shadow, a highlight, and an accent color, for example. Hill shading, openness, and/or colors are combined 725 to create a single visual representation of the terrain represented by the texture. Colors, hill shading, and openness textures may be different visual layers which are layered to create an overall image, or they may be combined into a single layer. For example, openness values associated with pixels of a texture may be used to determine an opaque shading for each pixel, which when placed over or combined with a colored and/or hill shaded texture layer produces more visually distinct geographic features when displayed, as exemplified in FIG. 8 below.

In an embodiment, the visual representation, or rendering, is formatted 730 appropriately for the display 216. For example, the rendering is cropped to match the dimensions of the display 216, or is encoded in a manner appropriate for a display screen. The rendering is sent 735 for display.

Figure 8:
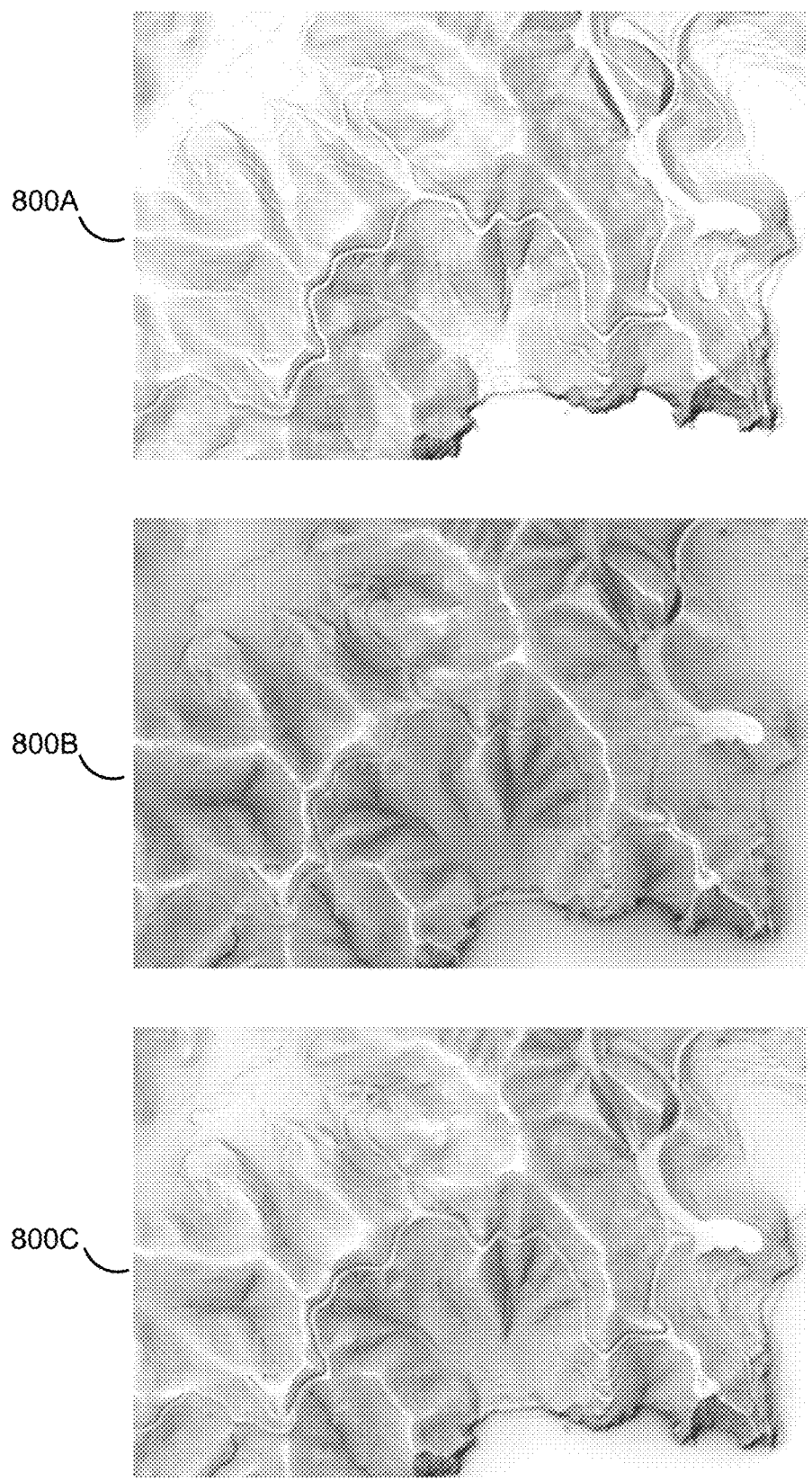
FIG. 8 is a diagram showing an example hill shading, an example openness, and an example hill shading with openness, according to one embodiment.

FIG. 8 is a diagram showing an example hill shading layer 800A, an example openness layer 800B, and an example hill shading with openness 800C, according to one embodiment. In this embodiment hill shading is represented using shades of yellow and blue in addition to white to represent the contours and varied elevations of terrain features for a geographic area, as seen in the example hill shading layer 800A. The zenith and azimuth used in the hill shading calculations caused shading as if the sun were shining over the geographic area from the top left. As such, yellow colorations correspond with parts of terrain features which would be in direct or nearly direct sunlight, whereas blue colorations correspond with parts of terrain features which would be in various amounts of shade or indirect sunlight. Greater intensity of color indicates a more extreme exposure to the light for yellow colorations, and a more extreme lack of sunlight for blue colorations. For example, several dark blue colorations near the bottom of the layer indicate steep slopes, such as cliffs, facing away from the direction of sunlight.

The example openness layer 800B is for the same geographic area and comprises shades of white, black, and grey to represent openness resulting from the contours and varied elevations of terrain features for the geographic area. Locations with low openness factors, which indicate a significant view of the sky from those geographic locations, are colored lighter shades, and locations with higher openness factors, which indicate obstructed view of the sky from those geographic locations, are colored darker shades.

The example openness layer 800B in this embodiment is a layer to be overlaid the example hill shading layer 800A, as opposed to being used to adjust the shading of the example hill shading layer 800A. The example hill shading with openness 800C is the resulting image from the overlaying of the example openness layer 800B over the example hill shading layer 800A. As seen in the figure, the combination of hill shading and openness creates a more visually distinctive and comprehensible representation of the terrain within the geographic area represented. In each layer 800, white coloration generally indicates locations which do not have elevation change, e.g. flat or nearly flat areas of the geographic area.

VI. Additional Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for efficiently rendering a texture, the method comprising:
   for pixels of a texture of a digital elevation model, where the pixels encode elevations pertaining to locations in a first geographic area, and where the digital elevation model further comprises at least part of a plurality of mipmap levels which encode elevations:
      determining an openness factor based at least in part on elevations at one or more pixels of the mipmap levels and performing at least one linear interpolation using at least one fractional pixel value; and
   rendering an electronic map corresponding to the first geographic area using the openness factor of the pixels of the texture.

2. The method of claim 1, further comprising:
   sending the texture for storage in a computer-readable storage medium;
   receiving a render request; and
   receiving the texture from storage.

3. The method of claim 1, further comprising:
receiving the digital elevation model from a server separate from a mobile computing device performing the method.

4. The method of claim 1, wherein the openness factors are used to adjust hill shading values.

5. The method of claim 1, wherein the digital elevation model is arranged as a grid, and wherein determining the openness factor further comprises:
for each direction of a plurality of directions on the grid from a pixel:
determining a greatest elevation among a plurality of pixels in the direction, where at least one pixel of the pixels in the direction is from at least part of a mipmap level; and
determining an angle based on the elevation of the pixel and the greatest elevation; and
averaging the determined angles.

6. The method of claim 1, wherein rendering the electronic map further comprises determining colors for pixels of the texture based at least in part on a determined openness factors of the pixels.

7. A non-transitory computer-readable storage medium storing computer program instructions executable by one or more processors to perform operations for efficiently rendering a texture, the operations comprising:
for pixels of a texture of a digital elevation model, where the pixels encode elevations pertaining to locations in a first geographic area, where the digital elevation model further comprises at least part of a plurality of mipmap levels which encode elevations:
determining an openness factor based at least in part on elevations at one or more pixels of the mipmap levels and performing at least one linear interpolation using at least one fractional pixel value; and
rendering an electronic map corresponding to the first geographic area using the openness factor of the pixels of the texture.

8. The non-transitory computer-readable storage medium of claim 7, the operations further comprising:
sending for storage the texture at a computer-readable storage medium;
receiving a render request; and
receiving from storage the texture.

9. The non-transitory computer-readable storage medium of claim 7, the operations further comprising:
receiving the digital elevation model from a server separate from a mobile computing device that comprises the one or more processors.

10. The non-transitory computer-readable storage medium of claim 7, wherein the openness factors are used to adjust hill shading values.

11. The non-transitory computer-readable storage medium of claim 7, wherein the digital elevation model is arranged as a grid, and wherein determining the openness factor further comprises:
for each direction of a plurality of directions on the grid from a pixel:
determining a greatest elevation among a plurality of pixels in the direction, where at least one pixel of the pixels in the direction is from at least part of a mipmap level; and
determining an angle based on the elevation of the pixel and the greatest elevation; and
averaging the angles.

12. The non-transitory computer-readable storage medium of claim 7, wherein rendering the electronic map further comprises determining colors for pixels of the texture based at least in part on determined openness factors of the pixels.

13. A method for efficiently rendering a texture, the method comprising:
for pixels of a texture of a digital elevation model, where the pixels encode elevations pertaining to locations in a first geographic area, and where the digital elevation model is arranged as a grid and further comprises at least part of a plurality of mipmap levels which encode elevations:
determining an openness factor based at least in part on elevations at one or more pixels of the mipmap levels and, for each direction of a plurality of directions on the grid from a pixel:
determining a greatest elevation among a plurality of pixels in the direction, where at least one pixel of the pixels in the direction is from at least part of a mipmap level;
determining an angle based on the elevation of the pixel and the greatest elevation; and
averaging the determined angles; and
rendering an electronic map corresponding to the first geographic area using the openness factor of the pixels of the texture.

14. The method of claim 13, further comprising:
sending the texture for storage in a computer-readable storage medium;
receiving a render request; and
receiving the texture from storage.

15. The method of claim 13, further comprising:
receiving the digital elevation model from a server separate from a mobile computing device performing the method.

16. The method of claim 13, wherein the openness factors are used to adjust hill shading values.

17. The method of claim 13, wherein rendering the electronic map further comprises determining colors for pixels of the texture based at least in part on a determined openness factors of the pixels.

* * * * *